(12) United States Patent
Wan

(10) Patent No.: US 9,509,130 B2
(45) Date of Patent: *Nov. 29, 2016

(54) MINIATURE BREAKER HAVING SHORT CIRCUIT SELF-LOCKING FUNCTION AND MINIATURE BREAKER HAVING POSITION STATE DETECTING FUNCTION

(75) Inventor: Jiasheng Wan, Wuhan (CN)

(73) Assignee: HUBEI SHENGJIA WIRING CO., LTD., Wuhan, Hubei (CN)

( * ) Notice: Subject to any disclaimer, the term of this patent is extended or adjusted under 35 U.S.C. 154(b) by 221 days.

This patent is subject to a terminal disclaimer.

(21) Appl. No.: 13/880,357

(22) PCT Filed: Dec. 17, 2010

(86) PCT No.: PCT/CN2010/002074
§ 371 (c)(1),
(2), (4) Date: Apr. 18, 2013

(87) PCT Pub. No.: WO2012/051744
PCT Pub. Date: Apr. 26, 2012

(65) Prior Publication Data
US 2015/0029633 A1 Jan. 29, 2015

(30) Foreign Application Priority Data

Oct. 18, 2010 (CN) .......................... 2010 1 0520199
Oct. 18, 2010 (CN) .......................... 2010 1 0526513

(51) Int. Cl.
*H01H 73/00* (2006.01)
*H02H 3/08* (2006.01)
(Continued)

(52) U.S. Cl.
CPC ................. *H02H 3/08* (2013.01); *H01H 3/26* (2013.01); *H01H 71/1018* (2013.01);
(Continued)

(58) Field of Classification Search
CPC ................................. H02H 3/08; H02H 71/70
See application file for complete search history.

(56) References Cited

U.S. PATENT DOCUMENTS 4,840,308 A * 6/1989 Akabane et al. ................ 236/13
2009/0314620 A1* 12/2009 Lee ............................... 200/401

FOREIGN PATENT DOCUMENTS

CN 101707169 * 5/2010

* cited by examiner

*Primary Examiner* — Thienvu Tran
*Assistant Examiner* — Tien Mai

(57) ABSTRACT

Both a miniature circuit breaker with short-circuit self-locking function and a miniature circuit breaker with position state detection function include: a first miniature circuit and a miniature circuit breaker operation output device. A motor, an action unit and a control unit are located within the casing of the miniature circuit breaker operation output device. The motor outputs a torque, the action unit obtains the torque and the torque is converted into the closing or breaking operation of the first miniature circuit breaker, the control unit controls the rotation and stop of the motor. A position state detection mechanism is located within the casing of the miniature circuit breaker operation output device of the miniature circuit breaker with position state detection function and triggers the control unit to stop the motor when the closing or breaking operation of the first miniature circuit breaker reaches the specified position.

18 Claims, 13 Drawing Sheets

(51) Int. Cl.
*H01H 3/26* (2006.01)
*H01H 71/10* (2006.01)
*H01H 71/70* (2006.01)
*H01H 71/02* (2006.01)

(52) U.S. Cl.
CPC ......... *H01H 71/1027* (2013.01); *H01H 71/70* (2013.01); *H01H 2003/266* (2013.01); *H01H 2071/0285* (2013.01)

MINIATURE BREAKER HAVING SHORT CIRCUIT SELF-LOCKING FUNCTION AND MINIATURE BREAKER HAVING POSITION STATE DETECTING FUNCTION

BACKGROUND OF THE PRESENT INVENTION

1. Field of Invention

The present invention relates to a miniature circuit breaker linkage group, and more particularly to a miniature circuit breaker with short-circuit self-locking function and a miniature circuit breaker with position state detection function.

2. Description of Related Arts

For the power department, the switch disconnecting device is essential to ensure electrical safety and circuit switching. With the launch of the national smart grid plan, it is important for the miniature circuit breaker to stride forward towards intellectualization, wherein it is an important utilization direction that the on-off of the power line is controlled by the miniature circuit breaker group, and how to achieve the automatic switch-on/off of the miniature circuit breaker group is a very important function. Currently, the automatic switch-on/off of a single miniature circuit breaker can be generally achieved by the electrically operated mechanism. However, the current electrically operated mechanism can only control the action of one miniature circuit breaker and can not control the actions of multiple miniature circuit breakers. Furthermore, most electrically operated mechanisms achieve the switch-on/off function aiming at the big switch, so that they have single function and low intelligent degree, thus they can not meet the actual demands. More importantly, the action and the position of the current electrically operated mechanism are mainly controlled by the linkage mechanism, which often requires the motor to achieve the positive inversion function for controlling the switch-on/off, thus resulting in the drawbacks of the relative large volume of the electrically operated mechanism and more complex linkage mechanism.

Especially in the case of short circuit fault, in spite that the corresponding miniature circuit breaker generates the interrupting action by self-protection, the electrically operated mechanism is not intelligent and still has the closing action, thereby resulting in the significant security risks of electricity.

In view of the above defects, the inventor of the present invention finally obtains the creation after a long period of research and practice.

SUMMARY OF THE PRESENT INVENTION

An object of the present invention is to provide a miniature circuit breaker with short-circuit self-locking function and a miniature circuit breaker with position state detection function for overcoming the above-mentioned drawbacks.

In order to accomplish the above object, the technical solution of the present invention lies in firstly providing a miniature circuit breaker with short-circuit self-locking function, comprising:

a first miniature circuit breaker located on a power line for generating a breaking action when a short-circuit fault occurs; and a miniature circuit breaker operation output device, comprising: a casing, in the casing, there are:

a motor for outputting a torque;

an action unit for obtaining the torque outputted by the motor and transferring the obtained torque to a closing action or the breaking action of the first miniature circuit breaker;

a control unit for controlling a rotation and stop of the motor; and a short-circuit protection linkage unit, wherein when the first miniature circuit breaker generates the breaking action due to the short-circuit fault, the short-circuit protection linkage unit sends an action signal to the control unit for the control unit stopping the motor after the short-circuit of the first miniature circuit breaker.

In which, the action unit comprises a rotation portion, a hand setting portion and a linkage piece, wherein the rotation portion obtains the torque outputted by the motor; the hand setting portion is a hand setting bar fixedly placed on the rotation portion and drives the linkage piece to swing; the linkage piece is connected with an action mechanism of the first miniature circuit breaker for driving the miniature circuit breaker to generate the closing or breaking action.

In which, the control unit comprises:

a power conversion circuit, wherein a voltage signal is obtained from a phase line L by the power conversion circuit and then rectified, filtered and reduced and a power is supplied for electrical components of the control unit;

a position detection circuit which sends a first control signal when the miniature circuit breaker is detected to reach a target position; and a trigger component which obtains the first control signal for triggering the rotation or stop of the motor.

Preferably, the position detection circuit comprises:

a first limit switch, wherein one end thereof is connected with ground and is triggered by a position detection mechanism; and a microprocessor connected with the first limit switch and outputs the first control signal when a state of the first limit switch is changed; wherein the position detection mechanism comprises:

a first trigger bar, wherein a first end of the first trigger bar is hinged within the casing of the miniature circuit breaker operation output device by a hinged shaft, an extending bar having a same direction with the hinged shaft is located at a second end of the first trigger bar and the second end is located on the first limit switch;

a first arched groove provided on the casing of the miniature circuit breaker operation output device, wherein the extending bar extends outside the casing of the miniature circuit breaker operation output device; and a second arched groove provided on a casing of the first miniature circuit breaker, wherein the extending bar extends into the first arched groove and is combined with a linkage mechanism of the first miniature circuit breaker;

wherein the trigger component is a first triode, a base thereof is connected with the other end of the first limit switch, an emitter thereof is connected with ground, and a collector thereof is connected with the motor.

Preferably, the position detection circuit comprises:

a first limit switch, wherein one end thereof is connected with ground and the first limit switch is triggered by a position detection mechanism, wherein the position detection mechanism comprises:

a first trigger bar, wherein a first end of the first trigger bar is hinged within the casing of the miniature circuit breaker operation output device by a hinged shaft, an extending bar having a same direction with the hinged shaft is located at a second end of the first trigger bar and the second end is located on the first limit switch;

a first arched groove provided on the casing of the miniature circuit breaker operation output device, wherein the extending bar extends outside the casing of the miniature circuit breaker operation output device; and a second arched groove provided on a casing of the first miniature circuit breaker, wherein the extending bar extends into the first arched groove and is combined with a linkage mechanism of the first miniature circuit breaker;

wherein the trigger component is a first triode, a base thereof is connected with the other end of the first limit switch, an emitter thereof is connected with ground, and a collector thereof is connected with the motor.

Preferably, the short-circuit protection linkage unit comprises:

a second limit switch, wherein one end thereof is connected with ground and the second limit switch is triggered by a short-circuit detection mechanism; and the microprocessor connected with the second limit switch and outputting and maintaining the first control signal when a state of the second limit switch is changed, wherein the short-circuit detection mechanism comprises:

a short-circuit detection lever, hinged within the casing of the miniature circuit breaker operation output device, wherein one end of the short-circuit detection lever extends outside the casing, the second limit switch is triggered by the short-circuit detection lever when the short-circuit detection lever rotates; and a reset spring located at the hinged shaft for resetting the short-circuit detection lever.

Preferably, the short-circuit protection linkage unit comprises:

a second triode, wherein an emitter thereof is connected with ground, a collector thereof is connected with the base of the first triode; and a second limit switch connected with a base of the second triode and triggered by a short-circuit detection mechanism, wherein the short-circuit detection mechanism comprises: a second linkage shaft, wherein one end of the second linkage shaft is fixedly located on a short-circuit self-locking action mechanism of at least one miniature circuit breaker, the second linkage shaft extends outside a slot at a side of the miniature circuit breaker into the casing and is located on the second limit switch.

Preferably, further comprises: a short-circuit indicating circuit for indicating when a circuit at which the miniature circuit breaker is located is short, wherein the short-circuit indicating circuit is an LED (light emitting diode) connected with the second limit switch.

Preferably, further comprises a delay circuit comprising a first capacitor, wherein one end of the first capacitor is connected with the base of the first triode, the other end thereof is connected with ground;

a discharge resistor, wherein one end of the discharge resistor is connected with the base of the first triode, and the other end thereof is connected with ground; and a zener diode for stabilizing the voltage.

Preferably, further comprises a detection switch located between the power conversion circuit and the phase line for disconnecting a power supply from the phase to the power conversion circuit in need of detection.

Preferably, the position detection circuit comprises:

an optocoupler, wherein an output terminal of the optocoupler is connected with a control terminal of the trigger component; and a sample sub-circuit obtaining a voltage signal form the phase line, connected with an input terminal of the optocoupler after rectifying, filtering and stabilizing the voltage signal.

Preferably, further comprises an external control unit for receiving an external control signal to operating the motor.

In which, the external control unit comprises:

a third triode, wherein a base thereof obtains the external control signal, and an emitter thereof is connected with ground;

a fourth triode, wherein a base thereof is connected with a collector of the third triode, an emitter thereof is connected with the collector of the second triode.

Preferably, further comprises a communication circuit for interacting data with an external device; and a storage circuit for storing programs and corresponding data.

Preferably, further comprises: a temperature detection chip connected with the microprocessor and outputting a trigger signal to the processor when a temperature is higher than a threshold value.

Preferably, further comprises a second miniature circuit breaker, wherein the first miniature circuit breaker and the second miniature circuit breaker are respectively located two sides of the miniature circuit breaker operation output device and the linkage piece is combined with an action mechanism of the second miniature circuit breaker.

Preferably, the rotation portion is a disc connected with an output shaft of the motor.

Preferably, the rotation portion is a worm gear disc which is engaged with a worm provided on an output shaft of the motor.

Preferably, the linkage piece comprises: a handle portion pivotally connected within the casing, wherein a top portion of the handle portion extends outside the casing, and a low extending portion thereof leans against the hand setting portion;

a linkage portion sleevedly provided the handle portion and a top portion of the handle of one of the first miniature circuit breaker and the second miniature circuit breaker.

Preferably, the linkage piece comprises: a rotation portion pivotally connected within the casing, and having a linkage bond placed hole, wherein a lower end of the rotation portion leans against the hand setting portion;

a linkage portion sleevedly provided the handle portion and an upper portion of the handle of one of the first miniature circuit breaker and the second miniature circuit breaker.

Preferably, the linkage portion is a connecting bar having a channel, the handles of the first miniature circuit breaker and the second miniature circuit breaker, and the handle portion are engaged with the channel.

Preferably, the linkage portion is a connecting bar, three through holes are respectively provided at three top ends of the handles of the two miniature circuit breakers and the handle portion, the connecting bar penetrates through the through holes.

Preferably, the linkage portion is a linkage bond, two linkage bond placed holes are respectively provided at two handles of the first miniature circuit breaker and the second miniature circuit breaker, the linkage bond is inserted into the two linkage bond placed holes at the two handles of the first miniature circuit breaker and the second miniature circuit breaker, and the linkage bond placed hole of the rotation portion for achieving the linkage.

In which, the power conversion circuit comprises:

a diode for rectifying;

a second capacitor for filtering;

a dropping resistor for reducing a voltage;

a zener diode for stabilizing the voltage.

To achieve the object, the technical solution adopted by the present invention lies in secondly providing a miniature circuit breaker with position state detection function, comprising: a first miniature circuit breaker and a miniature circuit breaker operation output device, in which, the first miniature circuit breaker located on the power line for cutting off a current of a circuit where the first miniature circuit breaker is by own closing or breaking action;

the miniature circuit breaker operation output device for controlling the closing or breaking action of the first miniature circuit breaker, wherein the miniature circuit breaker operation output device comprises: a casing, in the casing, there are:

a motor for outputting a torque;

an action unit for obtaining the torque outputted by the motor and transferring the obtained torque to the closing or breaking action of the first miniature circuit breaker;

a control unit for controlling a rotation and stop of the motor; and a position state detection unit, wherein when the closing or breaking action of the first miniature circuit breaker reaches a specific position, the control unit is triggered by the position state detection unit for controlling the motor to stop rotating.

In which, the position state detection unit comprises:

a first trigger bar, wherein a first end of the first trigger bar is hinged within the casing of the miniature circuit breaker operation output device by a hinged shaft, and an to extending bar having a same direction with the hinged shaft is located at a second end of the first trigger bar;

a first arched groove provided on the casing of the miniature circuit breaker operation output device, wherein the extending bar extends outside the casing of the miniature circuit breaker operation output device; and a second arched groove provided on a casing of the first miniature circuit breaker, wherein the extending bar extends into the first arched groove and is combined with a linkage mechanism of the first miniature circuit breaker.

Preferably, further comprises a second miniature circuit breaker, wherein the first miniature circuit breaker and the second miniature circuit breaker are respectively located at two sides of the miniature circuit breaker operation output device, and a linkage piece is combined with an action mechanism of the second miniature circuit breaker.

Preferably, the casing comprises a support plate placed within an interior thereof, and the motor is placed on the support plate.

In which, the action unit comprises: a rotation portion, a hand setting portion and a linkage piece, wherein, the rotation portion obtains the torque outputted by the motor; and the hand setting portion is a shift lever fixedly placed on the rotation portion.

Preferably, the rotation portion is a disc connected with an output shaft of the motor.

Preferably, the rotation is a worm gear disc engaged with a worm placed on an output shaft of the motor.

Preferably, the linkage piece comprises: a handle portion pivotally connected within the casing, wherein a top portion of the handle portion extends outside the casing, and a low-end extended section of the handle portion leans against the hand setting portion;

a linkage portion sleevedly provided provided the handle portion and a top portion of the handle of one of the first miniature circuit breaker and the second miniature circuit breaker.

Preferably, the linkage piece comprises: a rotation portion pivotally connected within the casing, and having a linkage bond placed hole, wherein a lower end of the rotation portion leans against the hand setting portion;

a linkage portion sleevedly provided the handle portion and an upper portion of the handle of one of the first miniature circuit breaker and the second miniature circuit breaker.

Preferably, the linkage portion is a connecting bar having a channel, the handles of the first miniature circuit breaker and the second miniature circuit breaker, and the handle portion are engaged with the channel.

Preferably, the linkage portion is a connecting bar, three through holes are respectively provided at three top ends of the handles of the two miniature circuit breakers and the handle portion, the connecting bar penetrates through the through holes.

Preferably, the linkage portion is a linkage bond, two linkage bond placed holes are respectively provided at two handles of the first miniature circuit breaker and the second miniature circuit breaker, the linkage bond is inserted into the two linkage bond placed holes at the two handles of the first miniature circuit breaker and the second miniature circuit breaker, and the linkage bond placed hole of the rotation portion for achieving the linkage.

Preferably, the control unit comprises:

a power conversion circuit, wherein a voltage signal is obtained from a phase line by the power conversion circuit, and then rectified, filtered for providing electrical components of the control unit with power;

a position detection circuit which sends a first control signal when the miniature circuit breaker is detected to reach a target position; and a trigger component which obtains the first control signal for triggering the rotation or stop of the motor.

In which, the position detection circuit comprises: a first limit switch, wherein one end thereof is connected with ground and is triggered by a position detection mechanism.

Preferably, the trigger component is a first triode, a base thereof is connected with the other end of the first limit switch, an emitter thereof is connected with ground, and a collector thereof is connected with the motor.

Preferably, further comprises: a delay circuit comprising a first capacitor, wherein one end of the first capacitor is connected with the base of the first triode, the other end thereof is connected with ground;

a discharge resistor, wherein one end of the discharge resistor is connected with the base of the first triode, and the other end thereof is connected with ground.

Preferably, further comprises: a short-circuit self-locking circuit, comprising:

a second triode, wherein an emitter thereof is connected with ground, a collector thereof is connected with a base of a first triode;

a second limit switch, wherein the second limit switch is connected with a base of the second triode and is triggered by a short-circuit detection mechanism, wherein, the short-circuit detection mechanism comprises: a second linkage shaft, wherein a first end thereof is fixedly located on the short-circuit self-locking operation mechanism of the first miniature circuit breaker or the second miniature circuit breaker, a second end thereof extends outside a groove at a side of the first miniature circuit breaker or the second miniature circuit breaker, into the casing, and is placed on the second limit switch.

Preferably, further comprises: a short-circuit indicating circuit for indicating when a circuit at which the miniature circuit breaker is located is short, wherein the short-circuit indicating circuit is an LED (light emitting diode) connected with the second limit switch.

In which, the power conversion circuit comprises:
a diode for rectifying;
a second capacitor for filtering;
a dropping resistor for reducing a voltage;
a zener diode for stabilizing the voltage.

Preferably, further comprises: a detection switch located between the power conversion circuit and the phase line for disconnecting a power supply from the phase to the power conversion circuit in need of detection.

Preferably, the position detection circuit comprises:
an optocoupler, wherein an output terminal of the optocoupler is connected with a control terminal of the trigger component; and
a sample sub-circuit obtaining a voltage signal form the phase line, connected with an input terminal of the optocoupler after rectifying, filtering and stabilizing the voltage signal.

Preferably, further comprises an external control unit for receiving an external control signal to operating the motor. In which, the external control unit comprises:
a third triode, wherein a base thereof obtains the external control signal, and an emitter thereof is connected with ground;
a fourth triode, wherein a base thereof is connected with a collector of the third triode, an emitter thereof is connected with the collector of the second triode;
the control unit further comprises: a microprocessor chip for controlling the motor.

Preferably, further comprises: a communication circuit for interacting data with an external device; and
a storage circuit for storing programs and corresponding data.

Compared with the prior art, the beneficial effects of the present invention are as below. 1: There are various functions and high intelligence, thus meeting the existing actual needs;
2. The volume is small and the structure is simple;
3. When the short-circuit fault occurs, the present invention can be self-locked, thus it has high security;
4. The present invention can form the control feedback with the miniature circuit breaker, thus improving the accuracy of the control.

These and other objectives, features, and advantages of the present invention will become apparent from the following detailed description, the accompanying drawings, and the appended claims.

DETAILED DESCRIPTION OF THE PREFERRED EMBODIMENT

The above-mentioned and other technical features and advantages of the present invention are further explained in detail with the accompanying drawings.

Figure 1:
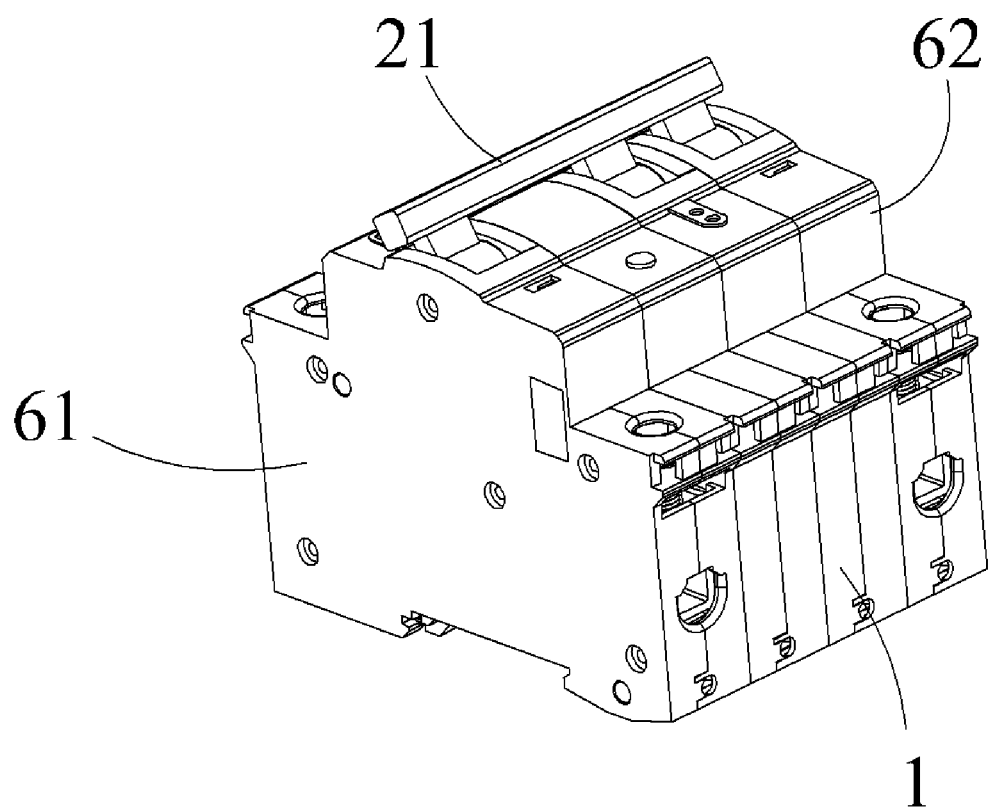
FIG. 1 is a three-dimensionally schematic diagram of a miniature circuit breaker according to a first preferred embodiment of the present invention.

FIG. 1 is a three-dimensionally schematic diagram of a miniature circuit breaker according to a first preferred embodiment of the present invention and is adapted for the miniature circuit breaker with position state detection function and the miniature circuit breaker with short-circuit self-locking function of the present invention. The miniature circuit breaker comprises a first miniature circuit breaker 61 and a miniature circuit breaker operation output device 1 connected with the first miniature circuit breaker 61 by a linkage portion 21, the linkage portion 21 is driven by an operation output of the miniature circuit breaker operation output device 1 to achieve the specified operation of the first miniature circuit breaker 61. Of course, the miniature circuit breaker can further comprise a second miniature circuit breaker 62. The second miniature circuit breaker 62 and the first miniature circuit breaker 61 are respectively located at two sides of the miniature circuit breaker operation output device 1, and are connected with each other by the linkage portion 21.

In the following description, the miniature circuit breaker operation output device respectively connected with the first miniature circuit breaker and the second miniature circuit breaker is taken as an example, and the first miniature circuit breaker and the second miniature circuit breaker are abbreviated as the miniature circuit breaker.

Figure 1A:
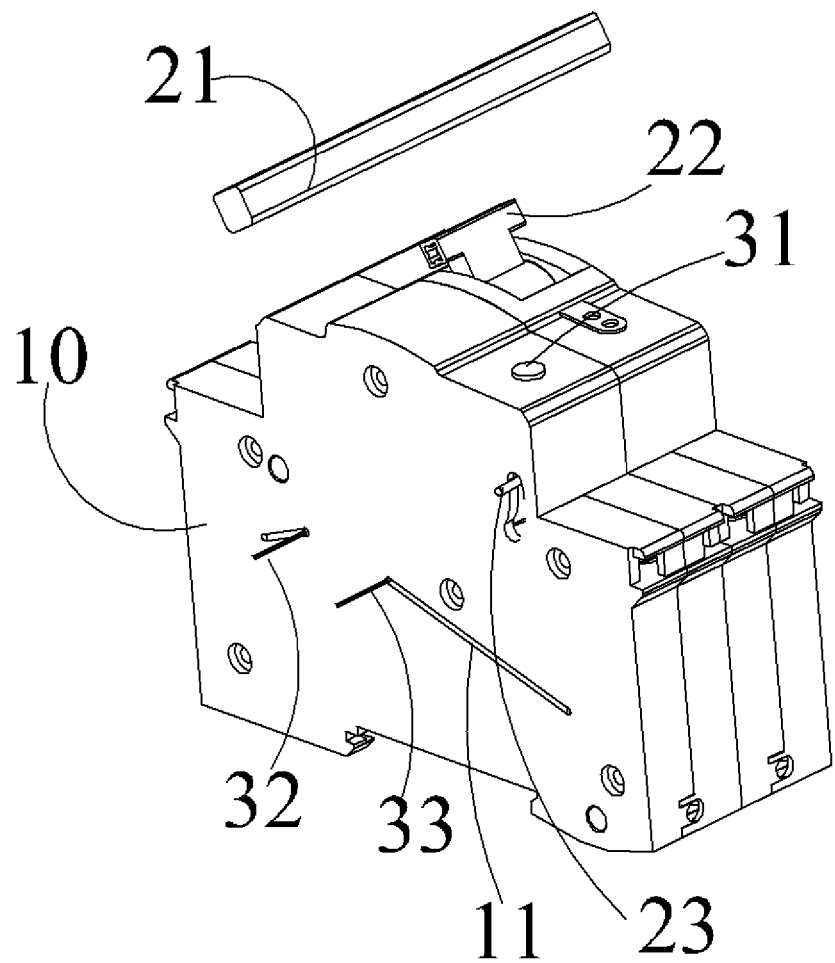
FIG. 1A is a three-dimensionally schematic diagram of a miniature circuit breaker operation output device according to the first preferred embodiment of the present invention.
Figure 1B:
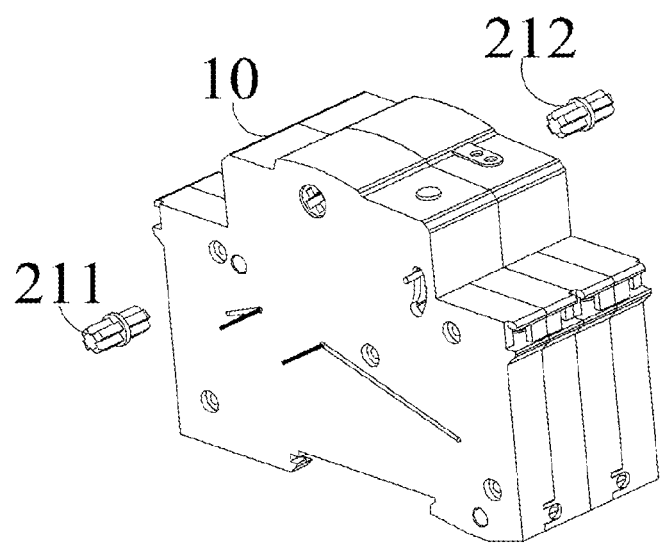
FIG. 1B is a three-dimensionally schematic diagram of a miniature circuit breaker operation output device according to a second preferred embodiment of the present invention.

FIG. 1A is a three-dimensionally schematic diagram of a miniature circuit breaker operation output device of the miniature circuit breaker according to the first preferred embodiment of the present invention and is adapted for the miniature circuit breaker with position state detection function and the miniature circuit breaker with short-circuit self-locking function of the present invention. The miniature circuit breaker operation output device comprises a casing 10, and a handle portion 22 extending outside the casing 10 and connected with a handle of the miniature circuit breaker by the linkage portion 21, wherein the handle portion 22 is driven to swing under the effect of a power mechanism and an action unit within the casing 10, so that the handle of the miniature circuit breaker is driven to further switch on and off the miniature circuit breaker.

The electricity of the control unit is derived from the miniature circuit breaker. The control unit comprises at least one connector 32 which can adopt a needle-shaped structure for being corresponding to a connecting chute on the miniature circuit breaker. A docking chute 11 is provided on the casing 10 for adjusting the binding tightness. The connector 32 (33) can obtain the power and can also obtain a control signal. The obtained power signal can be a signal after antihypertensive treatment in the miniature circuit breaker, and can also be an original phase line voltage which is correspondingly treated by the internal circuit of the miniature circuit breaker operation output device. An inspection switch 31 is located on the casing 10 and used in the need for maintenance. Once the inspection switch is pressed, the miniature circuit breaker operation output device can not be automatically switched on or off.

Figure 2A:
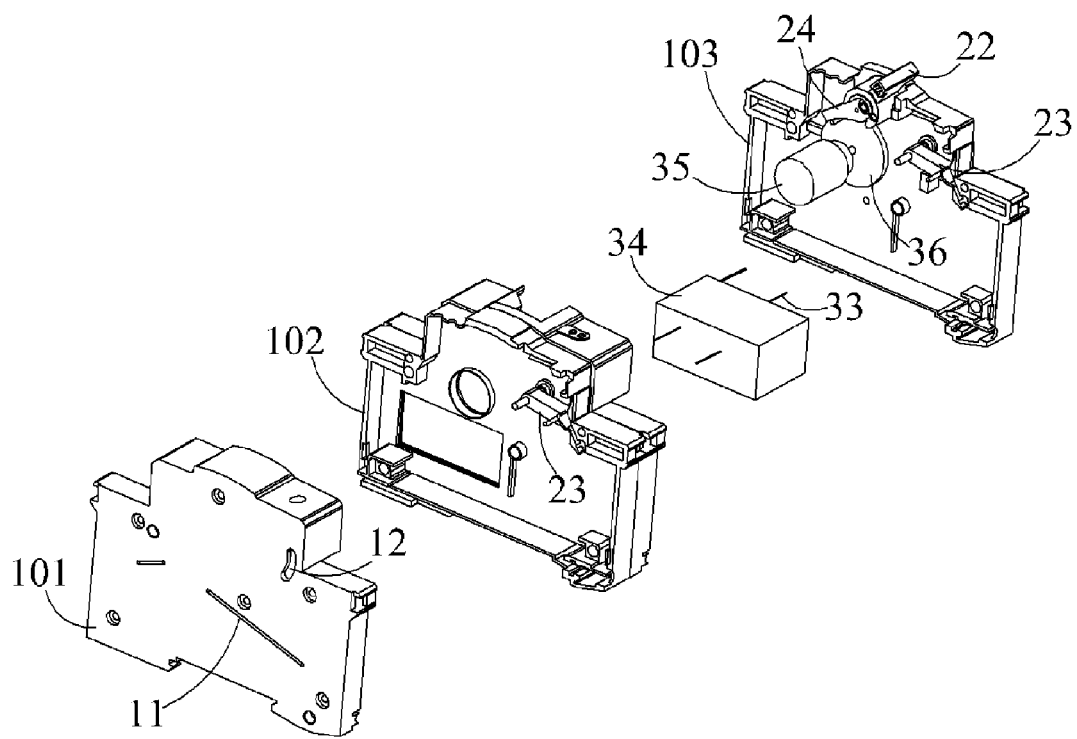
FIG. 2A is an exploded three-dimensionally schematic diagram of the miniature circuit breaker operation output device of the miniature circuit breaker according to the first preferred embodiment of the present invention.

FIG. 2A is a three-dimensionally schematic diagram of a miniature circuit breaker operation output device of the miniature circuit breaker according to a second preferred embodiment of the present invention and is adapted for the miniature circuit breaker with position state detection function and the miniature circuit breaker with short-circuit self-locking function of the present invention. The differences between the miniature circuit breaker operation output device in the first embodiment and that in the second embodiment are as below. The miniature circuit breaker operation output device in the second embodiment has no handle portion. A through hole is provided on the casing 10. A rotation portion of the action unit is provided within the casing 10. A linkage bond placed hole is provided on the rotation portion. The linkage portion in the first embodiment is replaced by two linkage bonds 211, 212. The linkage mechanism of the miniature circuit breaker connected with the miniature circuit breaker operation output device needs to be improved, in general, a linkage bond placed hole is provided at the middle of the handle of the miniature circuit breaker, one end of each of the linkage bonds 211, 212 is engaged with the linkage bond placed hole on the rotation portion, the other end thereof is engaged with the linkage bond placed hole on the handle of the miniature circuit breaker, so that the rotation is transferred to the handle of the miniature circuit breaker via the linkage bonds 211, 212 by the action of the rotation portion to achieve the specified operation.

The specified operation of the present invention should be understood as the breaking operation or the closing operation aiming at the miniature circuit breaker, and the specified position of the present invention should be understood as the breaking position or the closing position.

FIG. 2A is an exploded three-dimensionally schematic diagram of the miniature circuit breaker operation output device of the miniature circuit breaker according to the first preferred embodiment of the present invention and is adapted for the miniature circuit breaker with position state detection function and the miniature circuit breaker with short-circuit self-locking function of the present invention. The casing of the miniature circuit breaker operation output device consists of three portions: a left side casing 101, a right side casing 103 and a support plate 102 located between the left side casing and the right side casing. A docking chute 11 and a curved slot 12 which is adapted for the position detection are provided at at least one of the left side casing 101 and the right side casing 103. The power mechanism adopts a motor 35 located within a placed hole of the support plate 102. The action unit, adapted for achieving the closing operation or the breaking operation of the miniature circuit breaker, comprises a rotation portion 36, a hand setting portion 24 and a linkage piece, wherein the rotation portion 36 is adapted for obtaining an output torque of the motor 35, here, it is a disc connected with an output shaft of the motor 35; the hand setting portion 24 is a hand setting bar placed on the disc and drives the linkage piece to swing; the linkage piece comprises the handle portion 22 coaxially connected within the casing 10, wherein a top end of the handle portion extends outside the casing 10, a bottom end thereof contacts with the hand setting portion 24; the linkage portion 21 sleevedly located the handle portion 22 and the handle of the miniature circuit breaker for driving the miniature circuit breaker to achieve the closing operation or breaking operation.

The control unit 34 controls the rotation and the stop of the motor 35, and can be placed within the casing 10 in the form of modularization, which is convenient to replace, thus facilitating saving cost.

The miniature circuit breaker of the present invention comprises a position state detection unit which is adapted for the miniature circuit breaker with position state detection function and the miniature circuit breaker with short-circuit self-locking function of the present invention. When the closing operation or the breaking operation of the miniature circuit breaker reaches the specified position, the control unit is triggered by the position state detection unit to stop the rotation of the motor. Due to the motor 35 used as the transmission mode, the motor 35 makes a 360-degree rotation in the same direction at work. When the disc 36 is driven by the motor to rotate, the handle portion 22 must be driven by the hand setting portion 24 to rotate, so that the linkage portion 21 is driven to drive the handle of the miniature circuit breaker to swing, thereby finally achieve the closing operation and the breaking operation of the miniature circuit breaker. When the closing operation and the breaking operation of the miniature circuit breaker reaches the specified position, the motor 35 must be controlled to stop the rotation.

Figure 3:
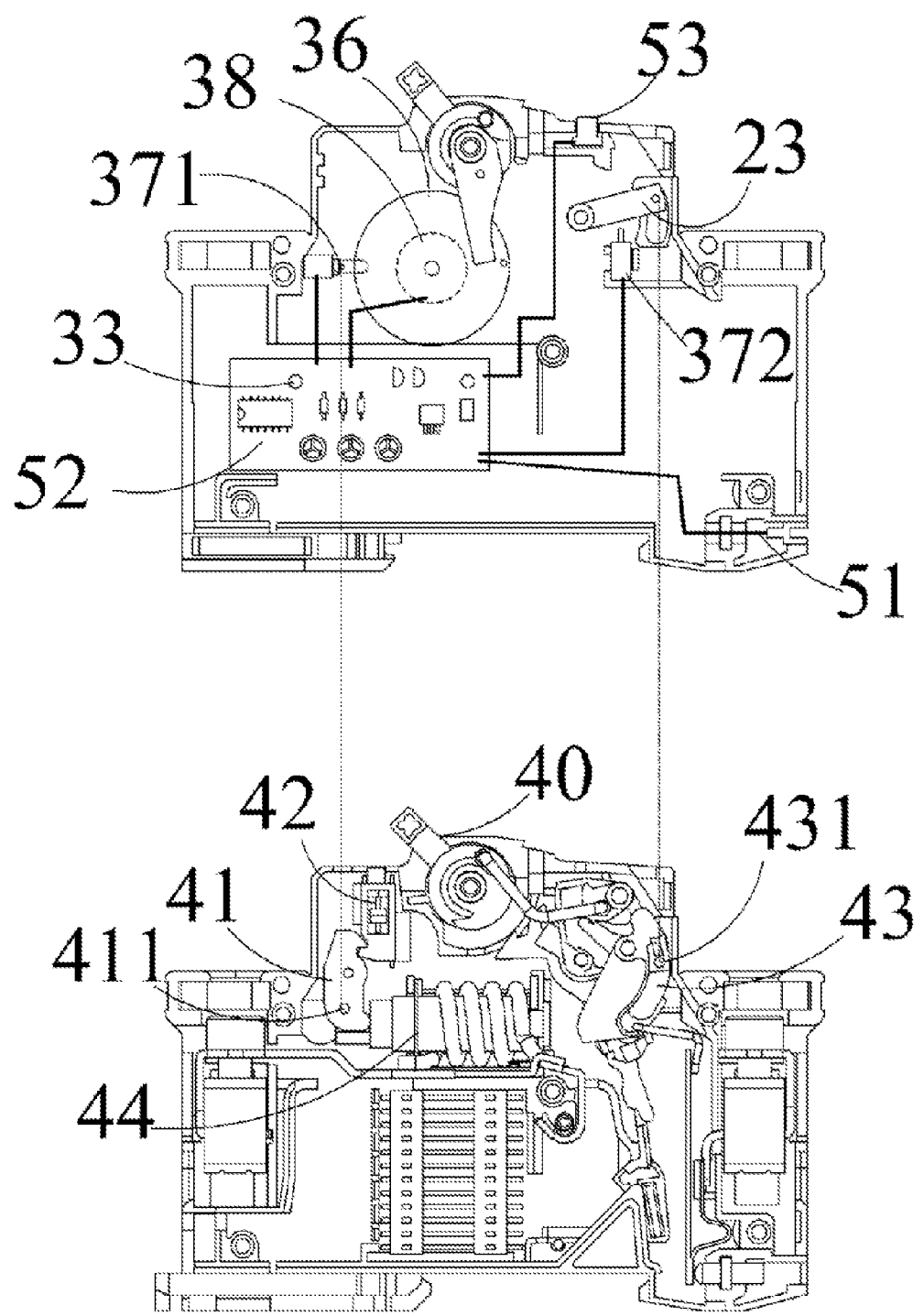
FIG. 3 is an internally structural view of the position detection mechanism and the short-circuit detection mechanism of the miniature circuit breaker operation output device of the miniature circuit breaker according to the first preferred embodiment of the present invention

The position state detection unit comprises: a first trigger bar 23, wherein a first end of the first trigger bar is hinged within the casing 10 of the miniature circuit breaker operation output device by a hinge shaft, an extending bar, having a same direction with the hinge shaft, is provided at a second end of the first trigger bar, and a first limit switch is provided at a low portion of the second end of the first trigger bar;

a first curved slot 12, provided on the casing 10 of the miniature circuit breaker operation output device, wherein the extending bar extends outside the casing 10 of the miniature circuit breaker operation output device by the first curved slot 12; and a second curved slot 622, provided on the casing of the miniature circuit breaker and corresponding to the first curved slot 12, wherein the extending bar extends into the second curved slot 622 and is combined with the linkage mechanism of the first miniature circuit breaker. When the miniature circuit breaker reaches the specified position in the closing process, the extending bar is driven by the linkage mechanism to swing, so as to further drive the first trigger bar 23 to swing around the hinge shaft for pressing against the first limit switch (as shown in FIG. 3), and the first limit switch is located at the low end of the first trigger bar 23. In some application conditions, at least two miniature circuit breakers are respectively combined at the left side and the right side of the miniature circuit breaker operation output device, thus so long as the closing operation or the breaking operation of one miniature circuit breaker reaches the specified position, the motor 35 will be stopped. Therefore, two position detection mechanisms are respectively provided at the two miniature circuit breakers at two sides of the miniature circuit breaker operation output device. There are two position detection mechanisms in this embodiment.

Moreover, the control unit module 34 is accommodated at the support plate 102 of the miniature circuit breaker operation output device, extends outside the connector 33 and stretches out by the docking chute 11 at the side of the casing 10.

Figure 2B:
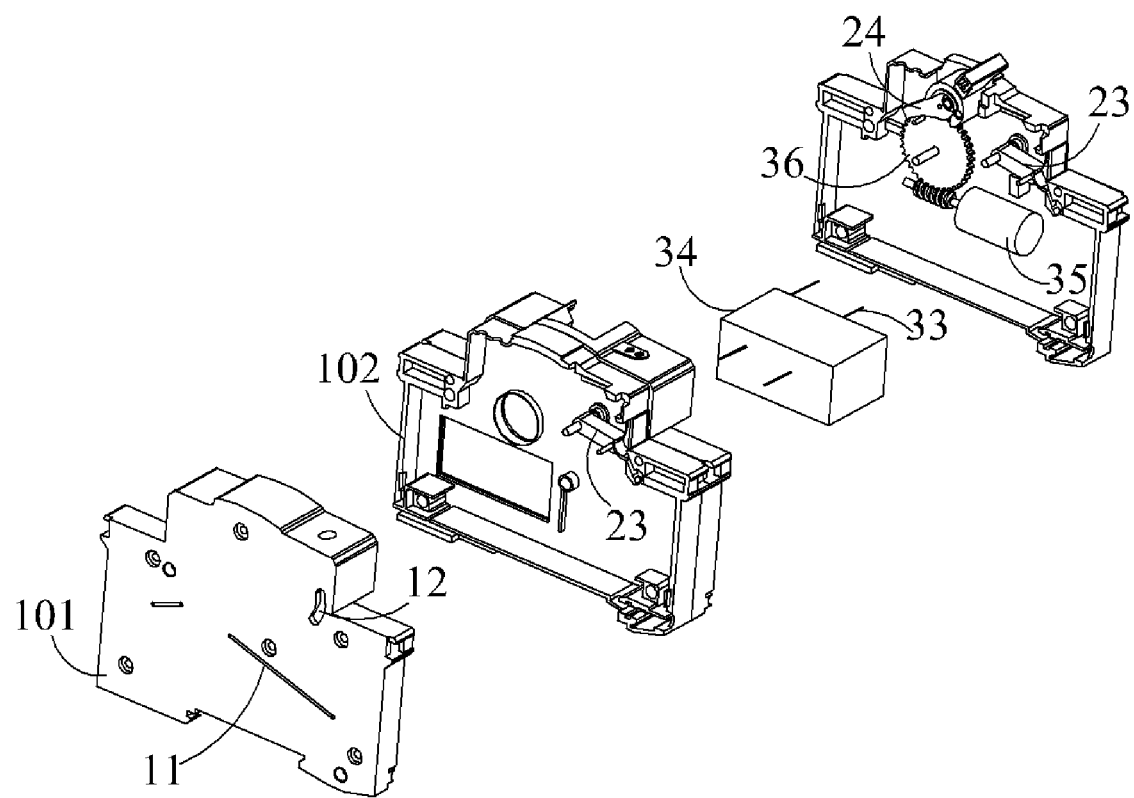
FIG. 2B is a second exploded three-dimensionally schematic diagram of the miniature circuit breaker operation output device of the miniature circuit breaker according to the first preferred embodiment of the present invention.

FIG. 2B is a second exploded three-dimensionally schematic diagram of the miniature circuit breaker operation output device of the miniature circuit breaker according to the first preferred embodiment of the present invention and is adapted for the miniature circuit breaker with position state detection function and the miniature circuit breaker with short-circuit self-locking function of the present invention. The differences between FIG. 2B and FIG. 2A are as below. In FIG. 2B, the rotation portion 36 of the action unit is a worm gear disc which is engaged with a worm provided on an output shaft of the motor 35. The hand setting portion 24 is provided on the worm gear disc.

FIG. 3 is an internally structural view of the position detection mechanism and the short-circuit detection mechanism of the miniature circuit breaker operation output device of the miniature circuit breaker according to the first preferred embodiment of the present invention and is adapted for the miniature circuit breaker with position state detection function and the miniature circuit breaker with short-circuit self-locking function of the present invention. The miniature circuit breaker operation output device, matching with the miniature circuit breaker with the short-circuit self-locking function, can also not be automatically closed when the short-circuit fault occurs. A short-circuit detection mechanism, located within the casing of the miniature circuit breaker operation output device, comprises a second linkage shaft 411, wherein one end thereof is fixedly located on a short-circuit self-locking operation mechanism of at least one miniature circuit breaker, the second linkage shaft 411 extends from an annular slot at a side of the miniature circuit breaker into the casing 10 and is provided on a second limit switch 371.

The miniature circuit breaker body with short-circuit self-locking function comprises: a rotating arm 41 which is capable of rotating around a shaft in the casing of the miniature circuit breaker, wherein a torsion spring is provided on the rotating arm, the rotating arm 41 has an interference end, due to the torsion spring, the other end of the rotating arm 41 leans against an armature end of the overcurrent release 44; and a self-locking piece 42, wherein a groove is provided at a low end of the self-locking piece and hitched with the interference end; a reset spring leaning against the casing of the miniature circuit breaker and located within the self-locking piece; wherein when the short-circuit fault occurs, the armature end of the overcurrent release 44 acts, so that a linkage arm 43 of a linkage component of the miniature circuit breaker is driven, thus the miniature circuit breaker generates the breaking operation. Due to the torsion spring, the rotating arm 41 rotates, so that the interference end is detached from the groove, under the effect of the reset spring, the self-locking piece 42 moves upwardly and extends outside the through hole of the casing of the miniature circuit breaker, a bottom end of the self-locking piece leans against the interference end of the rotating arm 41, so that a bottom end of the rotating arm 41 leans against the armature end, the overcurrent release 44 can not be reset, the linkage component can not work, thus the miniature circuit breaker is in the self-locking state and can not be closed, only the self-locking piece 42 is pressed into the casing, the closing operation can be normally completed. For the miniature circuit breaker operation output device, the second linkage shaft 411 can be located on the rotating arm 41, due to the rotation of the rotating arm 41, the second linkage shaft 411 is pressed on the second limit switch 371, so that a control signal is sent to a circuit board 52 of the control unit, thus the motor 35 can not rotate. It should be noted that a reducer 38 is added for sometimes increasing the output torque of the motor 35, wherein the motor is connected with the rotation portion 36 by the reducer 38.

The miniature circuit breaker operation output device comprises an external control signal access terminal 51, and an external control signal processing circuit is located on the circuit board 52 of the control unit for controlling the miniature circuit breaker operation output device via an external control.

How does the control unit 34 specifically function will be described as follows.

Figure 4A:
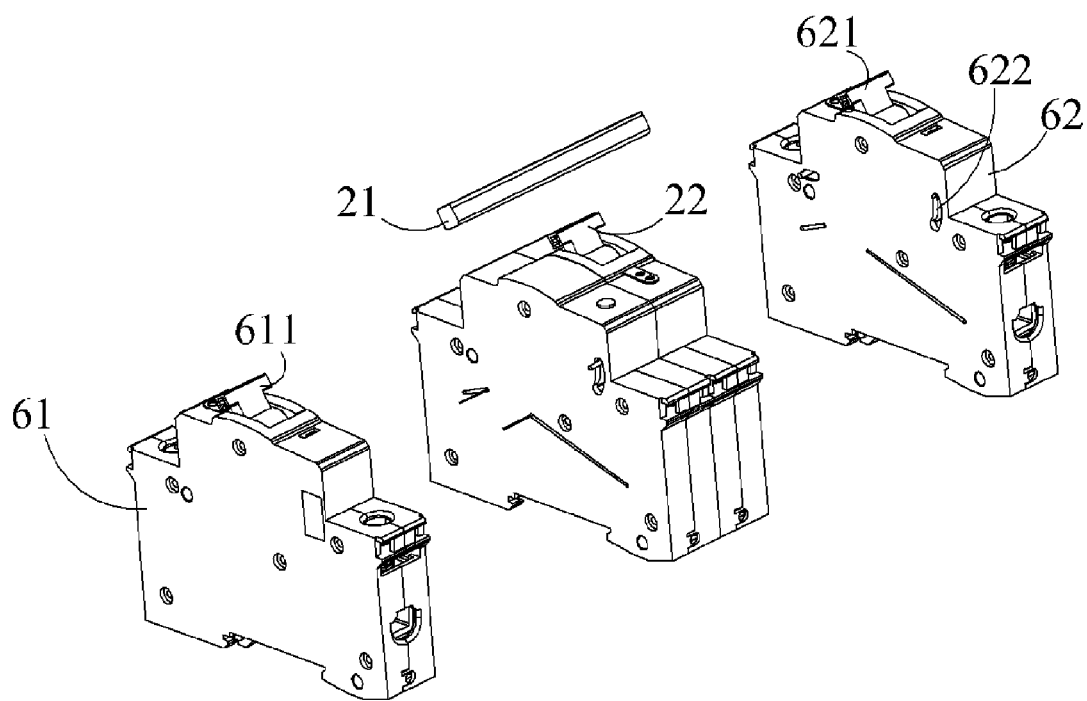
FIG. 4A is a three-dimensionally schematic diagram of the miniature circuit breaker operation output device of the miniature circuit breaker at the usage status according to the first preferred embodiment of the present invention

FIG. 4A is a three-dimensionally schematic diagram of the miniature circuit breaker operation output device of the miniature circuit breaker at the usage status according to the first preferred embodiment of the present invention, and is adapted for the miniature circuit breaker with position state detection function and the miniature circuit breaker with short-circuit self-locking function of the present invention. In this embodiment, the miniature circuit breaker operation output device is connected with two miniature circuit breakers 61, 62 respectively located at two sides of the miniature circuit breaker operation output device, the linkage portion 21 is a connecting bar having a channel, two top end portions of the handles 611, 621 of the two miniature circuit breakers and a top end portion of the handle portion 22 of the miniature circuit breaker operation output device are engaged with the channel for forming the linkage.

The connector 32 (33) of the miniature circuit breaker operation output device is connected with a corresponding power-taken hole or/and a signal-taken hole on the circuit board of the miniature circuit breaker by the connecting chute at the side of the miniature circuit breaker to achieve the connection.

Figure 4B:
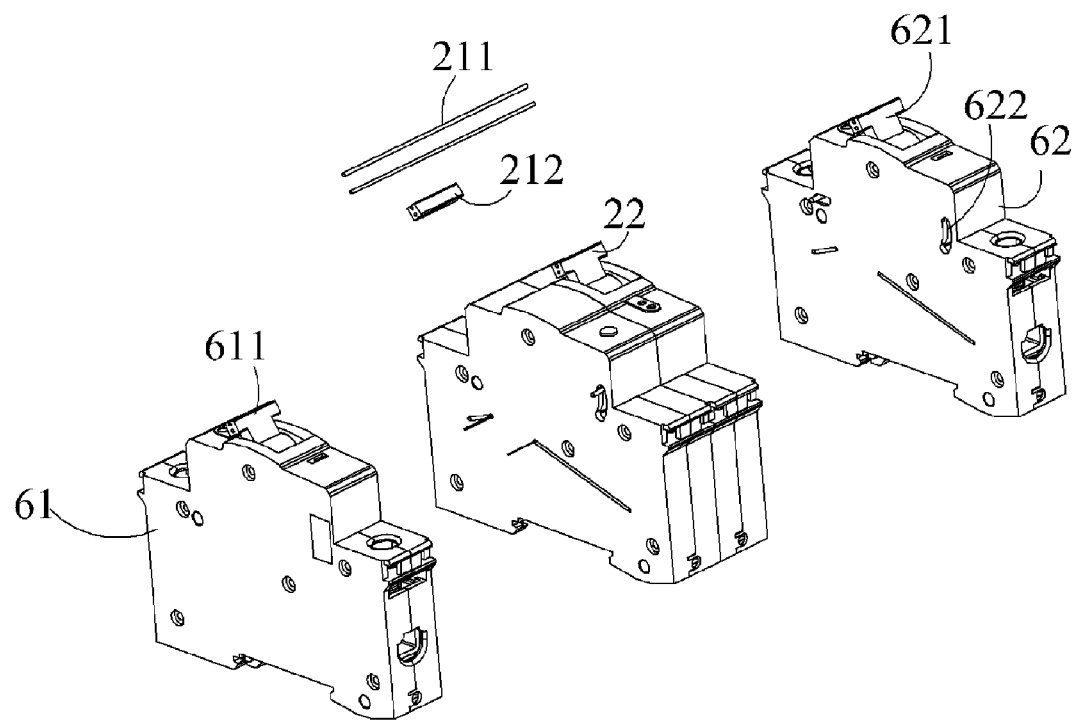
FIG. 4B is a three-dimensionally schematic diagram of the miniature circuit breaker operation output device of the miniature circuit breaker at the usage status according to the second preferred embodiment of the present invention

FIG. 4B is a three-dimensionally schematic diagram of the miniature circuit breaker operation output device of the miniature circuit breaker at the usage status according to the first preferred embodiment of the present invention, and is adapted for the miniature circuit breaker with position state detection function and the miniature circuit breaker with short-circuit self-locking function of the present invention. The differences between FIGS. 4A and 4B are as below. In FIG. 4B, the linkage portion is a connecting rod 211, three through holes are respectively provided at three top ends of the handles 611, 621 of the two miniature circuit breakers and the handle portion 22 of the miniature circuit breaker operation output device, the connecting rod 211 penetrates through the through holes for forming the linkage.

Figure 4C:
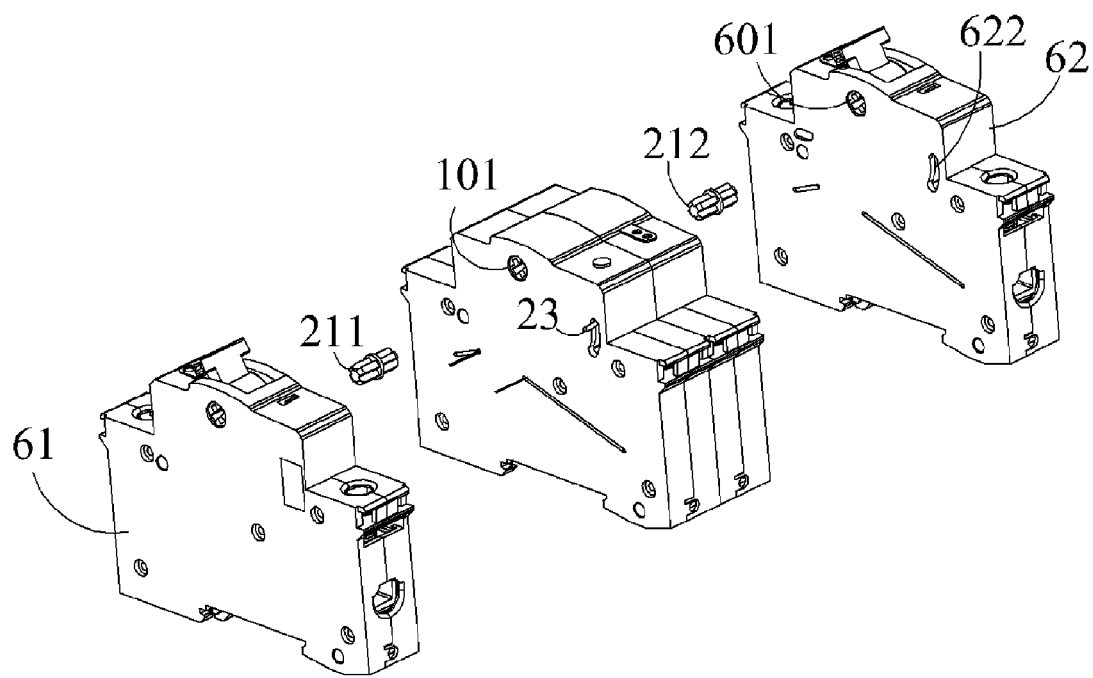
FIG. 4C is a three-dimensionally schematic diagram of the miniature circuit breaker operation output device of the miniature circuit breaker at the usage status according to the third preferred embodiment of the present invention

FIG. 4C is a three-dimensionally schematic diagram of the miniature circuit breaker operation output device of the miniature circuit breaker at the usage status according to the third preferred embodiment of the present invention, and is adapted for the miniature circuit breaker with position state detection function and the miniature circuit breaker with short-circuit self-locking function of the present invention. The differences between FIGS. 4A and 4C are as below. In FIG. 4C, the miniature circuit breaker operation output device has no the handle portion. Therefore, when the miniature circuit breakers are connected with the miniature circuit breaker operation output device, namely, one end of each of the linkage bonds 211, 212 is engaged with the linkage bond placed hole 101 on the rotation portion of the miniature circuit breaker operation output device, the other end thereof penetrates through the through hole 601 of the casing of the miniature circuit breaker and is engaged with the linkage bond placed hole on the handle of the miniature circuit breaker, so that the rotation is transferred to the handle of the miniature circuit breaker by the action of the rotation portion, thus the specific operation is achieved.

Figure 5:
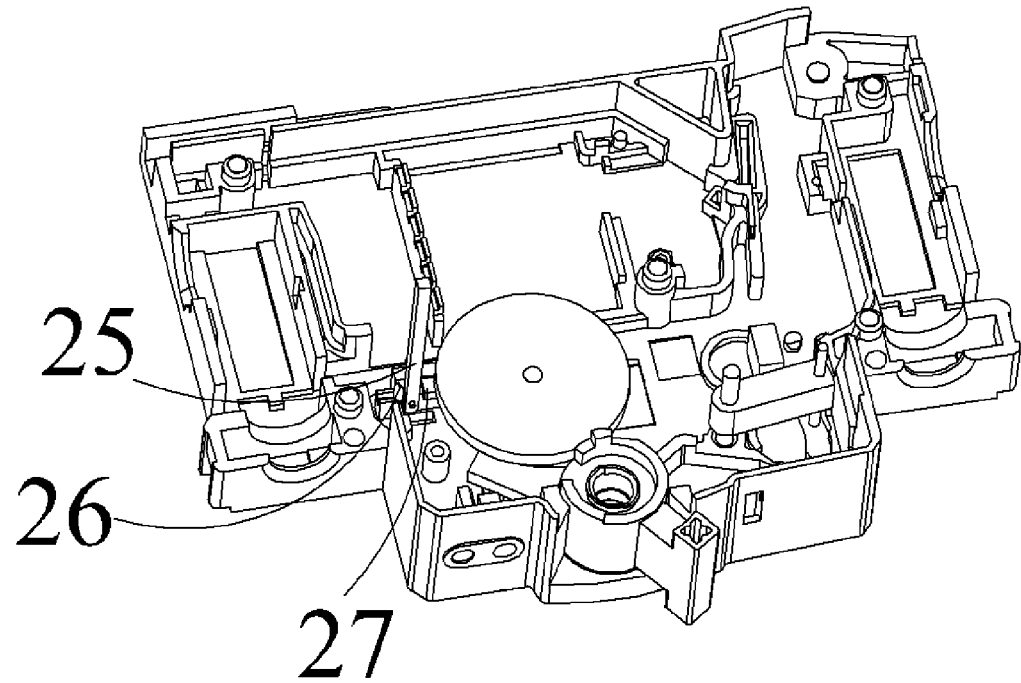
FIG. 5 is an internally structural diagram of the miniature circuit breaker operation output device with the short-circuit detection mechanism of the miniature circuit breaker with short-circuit self-locking function according to the first embodiment of the present invention.
Figure 6:
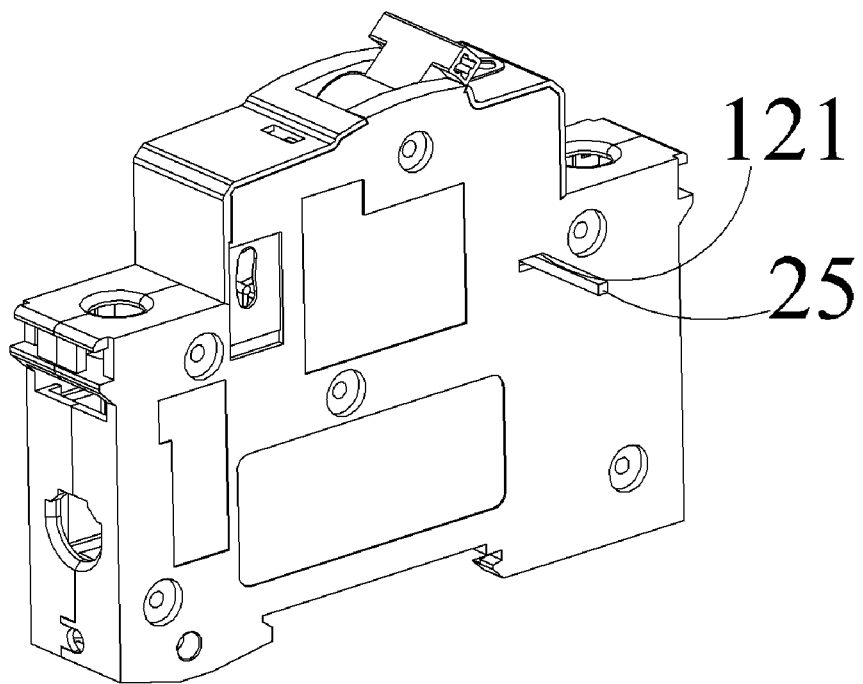
FIG. 6 is a three-dimensionally schematic diagram corresponding to FIG. 5.

FIG. 5 is an internally structural diagram of the miniature circuit breaker operation output device with the short-circuit detection mechanism of the miniature circuit breaker with short-circuit self-locking function according to the first embodiment of the present invention. The short-circuit detection mechanism comprises:

a short-circuit detection lever 25 hinged within the casing of the miniature circuit breaker operation output device by hinge shaft, wherein one end of the short-circuit detection lever extends outside the casing hole 121 (as shown in FIG. 6), when the short-circuit detection lever rotates around the hinge shaft, the short-circuit detection lever 25 trigger will trigger the second limit switch 27 for transmitting a state detection signal (a first control signal) to a corresponding micro-processing; and a reset spring 26 located at the hinge shaft for resetting the short-circuit detection lever.

Figure 7:
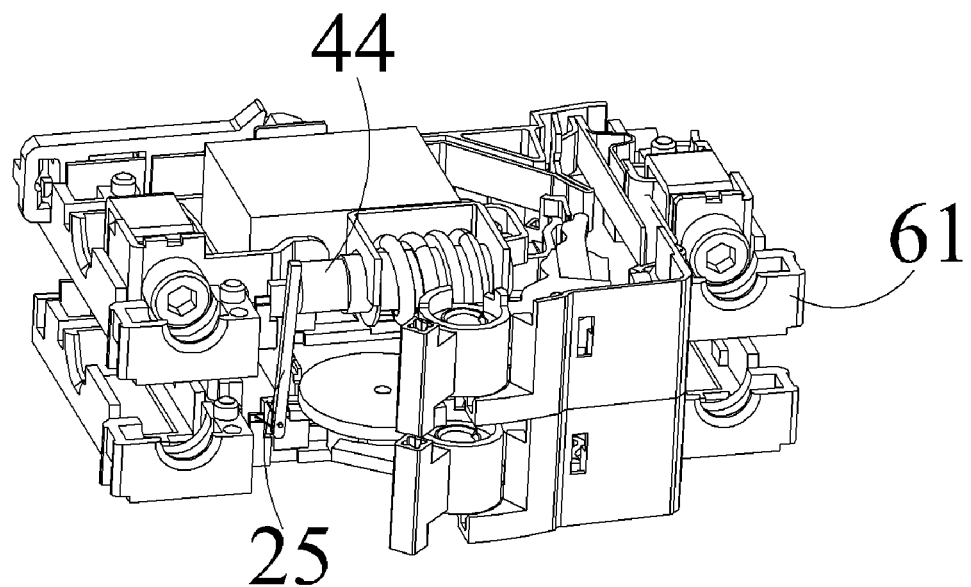
FIG. 7 is an internally structural diagram of the miniature circuit breaker operation output device of the miniature circuit breaker with short-circuit self-locking function, combined with the corresponding structure shown in FIG. 5 and the miniature circuit breaker.

FIG. 7 is an internally structural diagram of the miniature circuit breaker operation output device of the miniature circuit breaker with short-circuit self-locking function, combined with the corresponding structure shown in FIG. 5 and the miniature circuit breaker. The miniature circuit breaker 61 is attached with the miniature circuit breaker operation output device together, the iron core of the overcurrent release 44 of the miniature circuit breaker leans against the short-circuit detection lever 25, when the short-circuit fault occurs, the overcurrent release 44 acts to incrementally launch the short-circuit detection lever 25, in such a manner that the short-circuit detection lever 25 rotates around the hinge shaft so that the second limit switch 27 is triggered to generate the first control signal. When the overcurrent release 44 is reset, under the effect of the reset spring 26, the second limit switch 27 does not be triggered again.

Figure 8A:
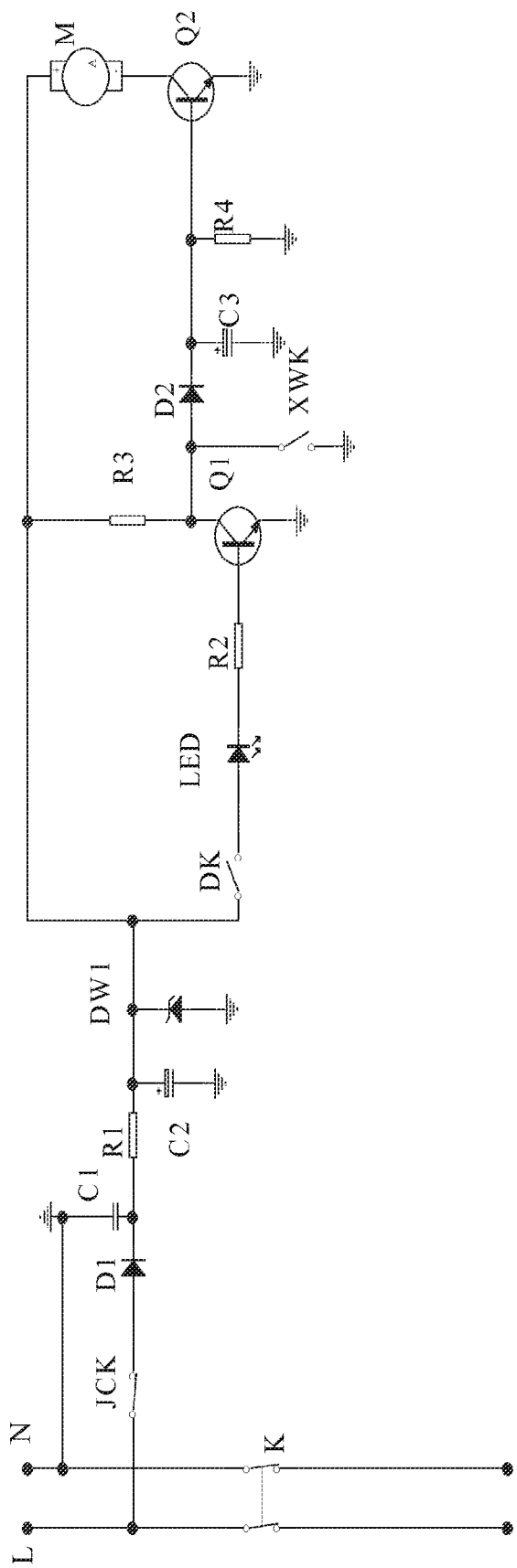
FIG. 8A is a first circuit schematic diagram of the control unit in the miniature circuit breaker operation output device of the miniature circuit breaker of the present invention.

FIG. 8A is a first circuit schematic diagram of the control unit in the miniature circuit breaker operation output device of the miniature circuit breaker of the present invention, and is adapted for the miniature circuit breaker with position state detection function and the miniature circuit breaker with short-circuit self-locking function. Its main object is to control the stop and the rotation of the motor. In actual applications, the motor rotates unidirectionally. The control unit comprises:

a power conversion circuit, wherein a voltage signal is obtained from the phase line L by the power conversion circuit and then rectified, filtered and reduced, and the power is supplied for electrical components of the control unit;

a position detection circuit which sends the first control signal once the miniature circuit breaker is detected to reach the target position; and a trigger component which obtains the first control signal for triggering the rotation or stop of the motor, wherein the power conversion circuit comprises: a diode D1 for obtaining an AC (alternating current) signal from the phase line L and then rectifying (namely, the connector directly obtains an unprocessed power signal from the phase line from the miniature circuit breaker); a second capacitor C1 connected with the diode D1 and a ground terminal for filtering; a dropping resistor R1 for reducing a voltage; and a zener diode for stabilizing the voltage.

The position detection circuit comprises:

a first limit switch XWK, wherein one terminal of the first limit switch is connected with ground and a trigger terminal thereof triggers by a first trigger lever of the limit detection mechanism, the trigger component can be a relay or triode, the triode is taken as an example in this embodiment and named as a first triode Q3, a base of the first triode is connected with the other end of the first limit switch XWK, an emitter thereof is connected with ground, a collector thereof is connected with the motor M.

A delay circuit is further included, and comprises: a first capacitor C3, wherein one end of the first capacitor is connected with the base of the first triode Q3, the other end thereof is connected with ground; and a discharge resistor R4, wherein one end of the discharge resistor is connected with the base of the first triode Q3, the other end thereof is connected with ground, namely, when the first limit switch XWK is triggered, at this time, due to the discharge process of the first capacitor C3, the first triode Q3 is still conducted to work for a period of time, thus the miniature circuit break is capable of being sufficiently closed or disconnected.

A detection switch JCK is further included, and is corresponding to the detection switch 31 on the casing, and located between the power conversion circuit and the phase line L for disconnecting the power supply from the phase line L to the power conversion circuit in need of detecting.

A short-circuit self-locking circuit is further included, and comprises:

a second triode Q2, wherein an emitter of the second triode is connected with ground, a collector thereof is connected with the base of the first triode Q3;

a second limit switch DK connected with a base of the second triode Q2 and triggered by the second linkage shaft by the short-circuit detection mechanism; and a short-circuit indicating circuit for indicating when the circuit at which the miniature circuit breaker is located is short, wherein the short-circuit indicating circuit is an LED (light emitting diode) connected with the second limit switch DK.

Figure 8B:
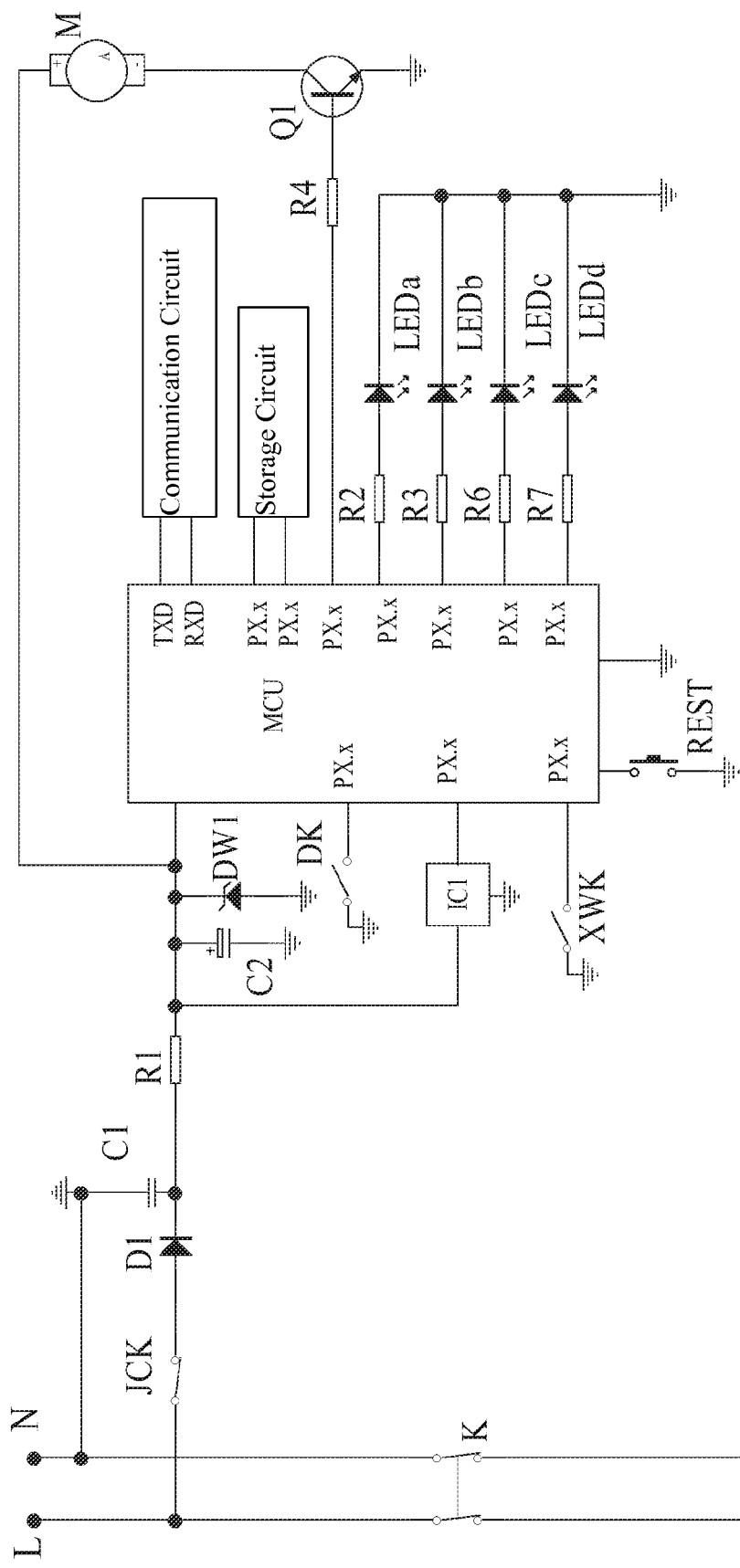
FIG. 8B is a second circuit schematic diagram of the control unit in the miniature circuit breaker operation output device of the miniature circuit breaker of the present invention.

FIG. 8B is a second circuit schematic diagram of the control unit in the miniature circuit breaker operation output device of the miniature circuit breaker of the present invention, and is adapted for the miniature circuit breaker with position state detection function and the miniature circuit breaker with short-circuit self-locking function. The differences between FIGS. 8A and 8B are as below. FIG. 8B uses the micro-processing chip MCU to achieve the function of the control unit. Factually, the micro-processing chip MCU is equivalent to the above-mentioned analog circuit, and it can be easily achieved for the person skilled in the art based on the idea of the analog circuit. A temperature capture chip IC1 is located at the signal input terminal of the micro-processing chip MCU for capturing the temperature parameters of the corresponding positions. A signal is sent by the micro-processing chip MCU at over-high temperature for controlling the rotation of the motor M, thus achieving the breaking action. A plurality of indicating lamps LEDa, LEDb, LEDc and LEDd respectively connected with corresponding output terminals of the micro-processing chip MCU for indicating the state of the miniature circuit breaker or the miniature circuit breaker operation output device. Due to the adoption of the micro-processing chip MCU, FIG. 8B further comprises a reset spring REST connected with the micro-processing chip MCU, a communication circuit for communicating with an external device to achieve the external control or interact and transmit corresponding data information, and a storage circuit for storing the control program or corresponding status data.

Figure 8C:
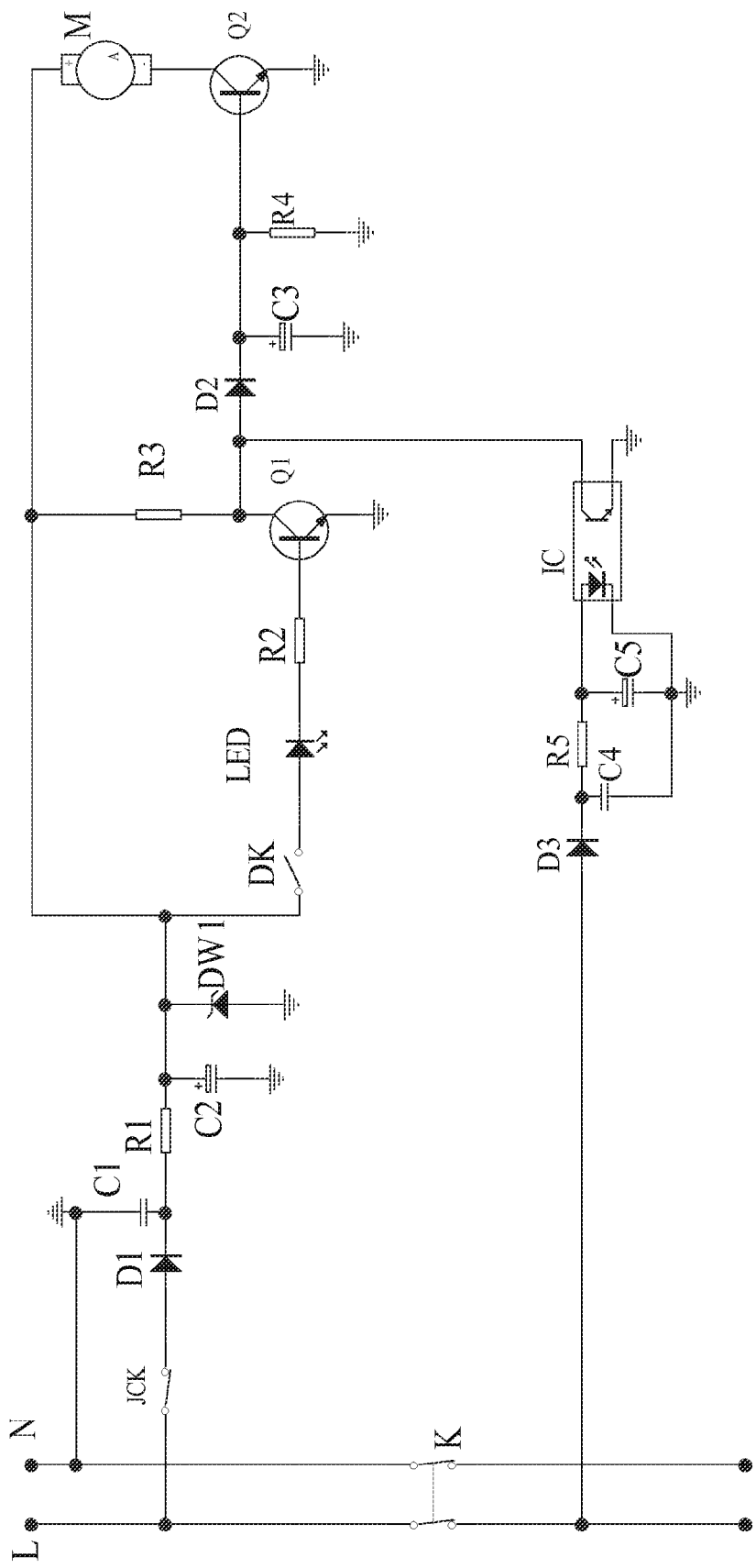
FIG. 8C is a third circuit schematic diagram of the control unit in the miniature circuit breaker operation output device of the miniature circuit breaker of the present invention.

FIG. 8C is a third circuit schematic diagram of the control unit in the miniature circuit breaker operation output device of the miniature circuit breaker of the present invention, and is adapted for the miniature circuit breaker with position state detection function and the miniature circuit breaker with short-circuit self-locking function. The difference between FIGS. 8A and 8C is that the position detection circuit comprises:

an optocoupler IC, wherein an output terminal of the optocoupler is connected with a control terminal of the trigger component, the first triode Q3; and a sample sub-circuit obtaining a voltage signal form the phase line L, connected with an input terminal of the optocoupler IC after rectifying, filtering and stabilivolting the voltage signal, and from the specific implementation, comprising a diode D3 for rectifying, and a capacitor C4 for filtering. This embodiment is mainly applied to the miniature circuit breaker operation output device for closing the miniature circuit breaker, namely, after closing the miniature circuit breaker, the sampling sub-circuit obtain the voltage signal for conducting the optocoupler IC, so that the base of the first triode Q3 is a low level to stop the motor M.

Figure 8D:
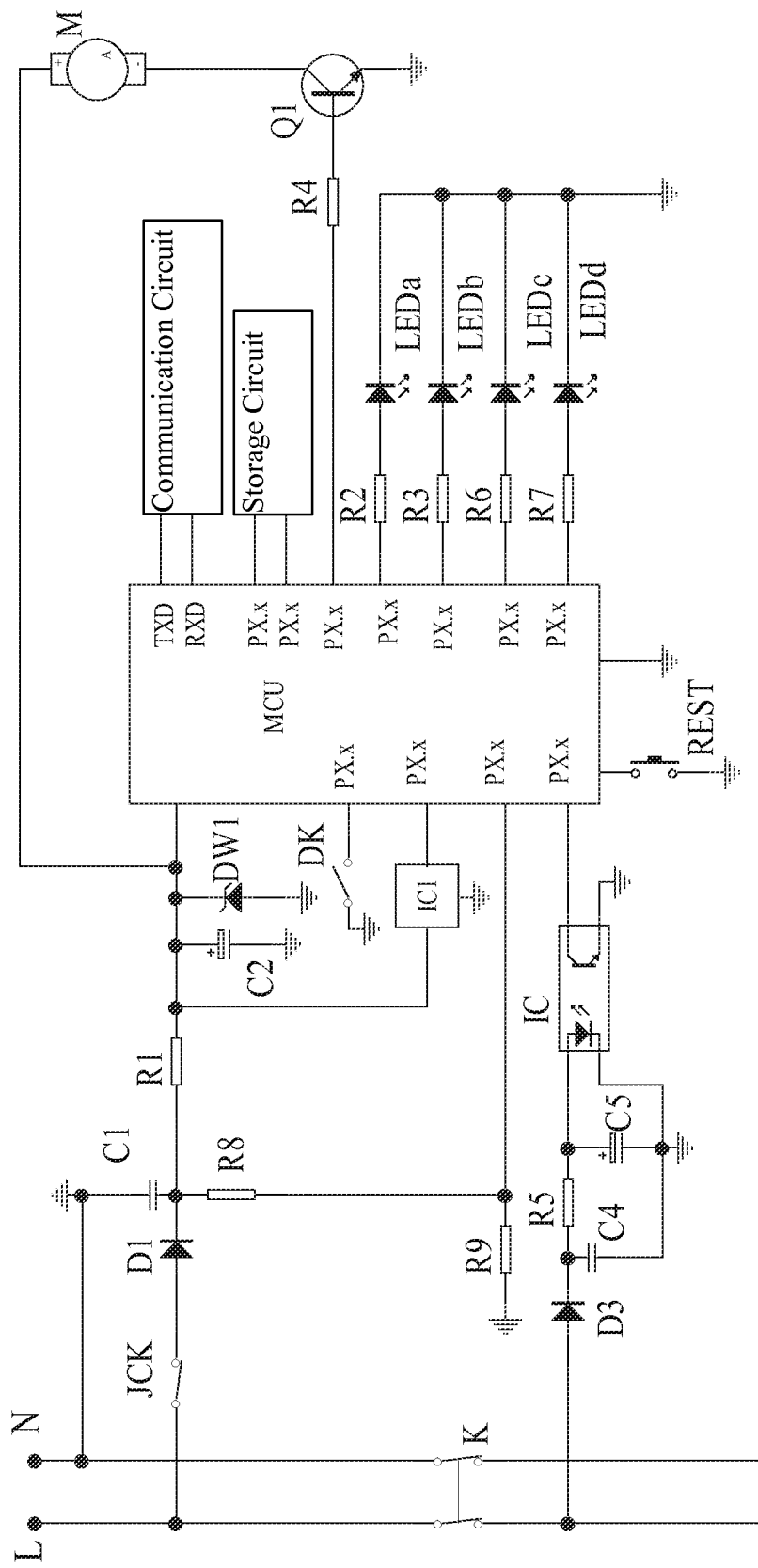
FIG. 8D is a fourth circuit schematic diagram of the control unit in the miniature circuit breaker operation output device of the miniature circuit breaker of the present invention.

FIG. 8D is a fourth circuit schematic diagram of the control unit in the miniature circuit breaker operation output device of the miniature circuit breaker of the present invention, and is adapted for the miniature circuit breaker with position state detection function and the miniature circuit breaker with short-circuit self-locking function. The difference between FIGS. 8B and 8D is that the position detection circuit comprises:

an optocoupler IC, wherein an output terminal of the optocoupler is connected with a control terminal of the trigger component, the first triode Q3; and a sample sub-circuit obtaining a voltage signal form the phase line L, connected with an input terminal of the optocoupler IC after rectifying, filtering and stabilivolting the voltage signal, and from the specific implementation, comprising a diode D3 for rectifying, and a capacitor C4 for filtering. This embodiment is mainly applied to the miniature circuit breaker operation output device for closing the miniature circuit breaker, namely, after closing the miniature circuit breaker, the sampling sub-circuit obtain the voltage signal for conducting the optocoupler IC, so that the base of the first triode Q3 is a low level to stop the motor M.

Figure 8E:
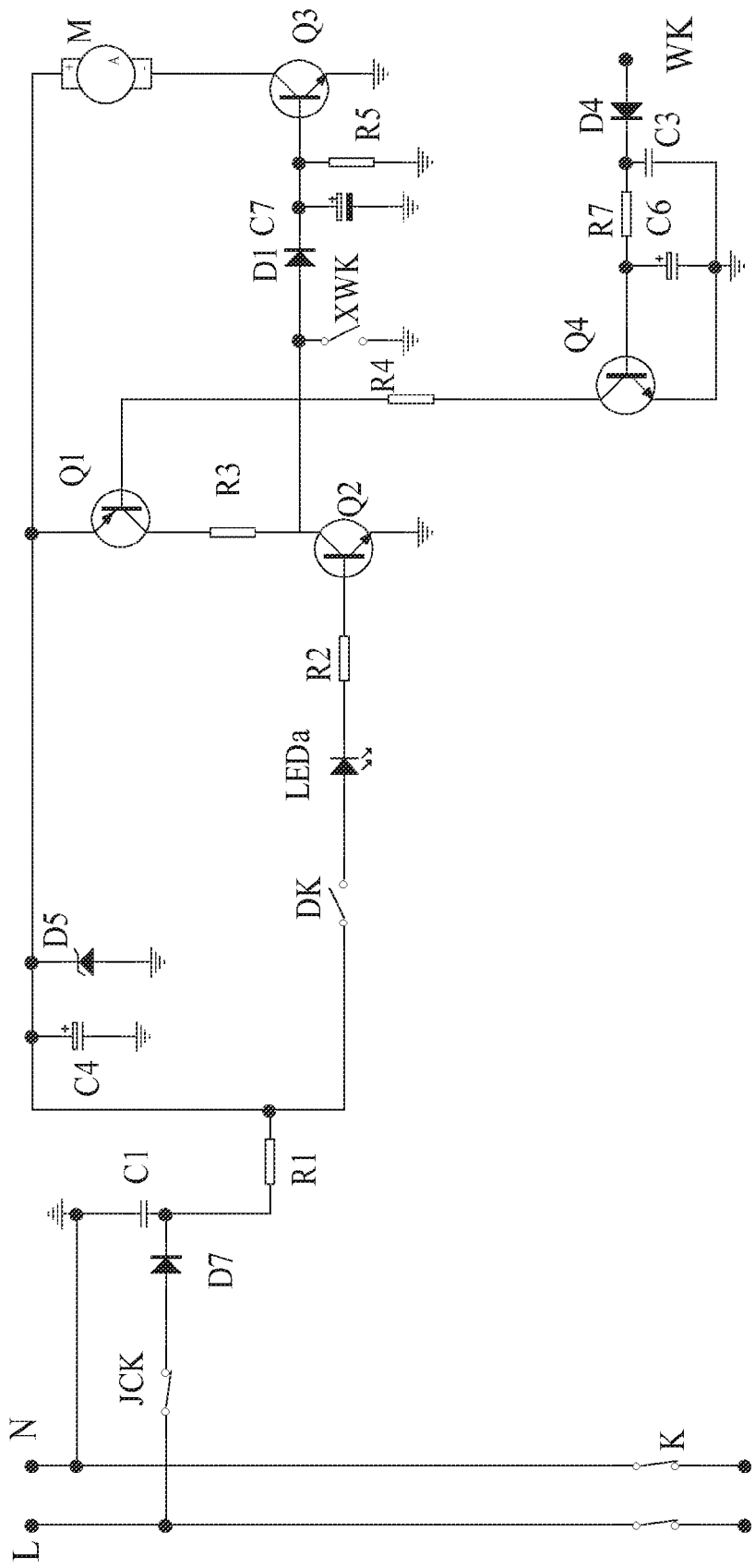
FIG. 8E is a fifth circuit schematic diagram of the control unit in the miniature circuit breaker operation output device of the miniature circuit breaker of the present invention.

FIG. 8E is a fifth circuit schematic diagram of the control unit in the miniature circuit breaker operation output device of the miniature circuit breaker of the present invention, and is adapted for the miniature circuit breaker with position state detection function and the miniature circuit breaker with short-circuit self-locking function. The difference between FIGS. 8A and 8E is that FIG. 8E further comprises an external control unit (an external control signal processing unit) for receiving an external control signal to operate the motor. The external control unit comprises a third triode Q4, wherein a base thereof obtains the external control signal WK, and an emitter thereof is connected with ground; a fourth triode Q1, wherein a base thereof is connected with a collector of the third triode Q4, an emitter thereof is connected with the collector of the second triode Q4. At initial state, the external control signal WK is a high-level signal, at this time, the third triode Q4 is conducted, so that the entire control to the motor M in FIG. 8E is the same as that in FIG. 8A. When the external control signal WK is a low-level signal, at this time, the third triode Q4 is disconnected, so that the first triode Q3 is disconnected, at this time, the motor is always in a stopped state.

The descriptions are only the preferred embodiments of the present invention, are only illustrative for the present invention and not restrictive. One skilled in the art understand that the descriptions mentioned above can be changed, modified, or even the equivalent descriptions within the spirit and scope as limited in the claims of the present invention, will be encompassed within the scope of protection of the present invention.

What is claimed is:

1. A miniature circuit breaker with short-circuit self-locking function, comprising a first miniature circuit breaker and a miniature circuit breaker operation output device, wherein, the first miniature circuit breaker is located on a power line for generating a breaking action when a short-circuit fault occurs;

the miniature circuit breaker operation output device comprises: a casing, in the casing, there are:

a motor for outputting a torque;

an action unit for obtaining the torque outputted by the motor and transferring the obtained torque to a closing action or the breaking action of the first miniature circuit breaker;

a control unit for controlling a rotation and stop of the motor; and a short-circuit protection linkage unit, wherein when the first miniature circuit breaker generates the breaking action due to the short-circuit fault, the short-circuit protection linkage unit sends an action signal to the control unit for the control unit stopping the motor after the short-circuit of the first miniature circuit breaker, wherein the control unit comprises:
a power conversion circuit, wherein a voltage signal is obtained from a phase line L by the power conversion circuit and then rectified, filtered and reduced and a power is supplied for electrical components of the control unit;
a position detection circuit which sends a first control signal when the miniature circuit breaker is detected to reach a target position; and
a trigger component which obtains the first control signal for triggering the rotation or stop of the motor,
wherein the position detection circuit comprises:
a first limit switch, wherein one end thereof is connected with ground and is triggered by a position detection mechanism; and
a microprocessor connected with the first limit switch and outputs the first control signal when a state of the first limit switch is changed; wherein, the position detection mechanism comprises:
a first trigger bar, wherein a first end of the first trigger bar is hinged within the casing of the miniature circuit breaker operation output device by a hinged shaft, an extending bar having a same direction with the hinged shaft is located at a second end of the first trigger bar and the second end is located on the first limit switch;
a first arched groove provided on the casing of the miniature circuit breaker operation output device, wherein the extending bar extends outside the casing of the miniature circuit breaker operation output device; and
a second arched groove provided on a casing of the first miniature circuit breaker, wherein the extending bar extends into the first arched groove and is combined with a linkage mechanism of the first miniature circuit breaker;
wherein the trigger component is a first triode, a base thereof is connected with the other end of the first limit switch, an emitter thereof is connected with ground, and a collector thereof is connected with the motor.

2. The miniature circuit breaker with short-circuit self-locking function, as recited in claim 1, characterized in that, the short-circuit protection linkage unit comprises:
a second limit switch, wherein one end thereof is connected with ground and the second limit switch is triggered by a short-circuit detection mechanism; and
the microprocessor connected with the second limit switch and outputting and maintaining the first control signal when a state of the second limit switch is changed, wherein the short-circuit detection mechanism comprises:
a short-circuit detection lever, hinged within the casing of the miniature circuit breaker operation output device, wherein one end of the short-circuit detection lever extends outside the casing, the second limit switch is triggered by the short-circuit detection lever when the short-circuit detection lever rotates; and
a reset spring located at the hinged shaft for resetting the short-circuit detection lever.

3. A miniature circuit breaker with short-circuit self-locking function, characterized in that, which comprises: a first miniature circuit breaker and a miniature circuit breaker operation output device, wherein,
the first miniature circuit breaker is located on a power line for generating a breaking action when a short-circuit fault occurs;
the miniature circuit breaker operation output device comprises: a casing, in the casing, there are:
a motor for outputting a torque;
an action unit for obtaining the torque outputted by the motor and transferring the obtained torque to a closing action or the breaking action of the first miniature circuit breaker;
a control unit for controlling a rotation and stop of the motor; and
a short-circuit protection linkage unit, wherein when the first miniature circuit breaker generates the breaking action due to the short-circuit fault, the short-circuit protection linkage unit sends an action signal to the control unit for the control unit stopping the motor after the short-circuit of the first miniature circuit breaker;
wherein the control unit comprises:
a power conversion circuit, wherein a voltage signal is obtained from a phase line L by the power conversion circuit and then rectified, filtered and reduced and a power is supplied for electrical components of the control unit;
a position detection circuit which sends a first control signal when the miniature circuit breaker is detected to reach a target position; and
a trigger component which obtains the first control signal for triggering the rotation or stop of the motor,
wherein the position detection circuit comprises:
a first limit switch, wherein one end thereof is connected with ground and the first limit switch is triggered by a position detection mechanism, wherein the position detection mechanism comprises:
a first trigger bar, wherein a first end of the first trigger bar is hinged within the casing of the miniature circuit breaker operation output device by a hinged shaft, an extending bar having a same direction with the hinged shaft is located at a second end of the first trigger bar and the second end is located on the first limit switch;
a first arched groove provided on the casing of the miniature circuit breaker operation output device, wherein the extending bar extends outside the casing of the miniature circuit breaker operation output device; and
a second arched groove provided on a casing of the first miniature circuit breaker, wherein the extending bar extends into the first arched groove and is combined with a linkage mechanism of the first miniature circuit breaker;
wherein the trigger component is a first triode, a base thereof is connected with the other end of the first limit switch, an emitter thereof is connected with ground, and a collector thereof is connected with the motor.

4. The miniature circuit breaker with short-circuit self-locking function, as recited in claim 3, characterized in that, the short-circuit protection linkage unit comprises:
a second triode, wherein an emitter thereof is connected with ground, a collector thereof is connected with the base of the first triode; and
a second limit switch connected with a base of the second triode and triggered by a short-circuit detection mechanism,
wherein the short-circuit detection mechanism comprises:
a second linkage shaft, wherein one end of the second linkage shaft is fixedly located on a short-circuit self-locking action mechanism of at least one miniature circuit breaker, the second linkage shaft extends outside a slot at a side of the miniature circuit breaker into the casing and is located on the second limit switch.

5. The miniature circuit breaker with short-circuit self-locking function, as recited in claim 4, characterized in that, further comprises: a delay circuit comprising a first capacitor, wherein one end of the first capacitor is connected with the base of the first triode, the other end thereof is connected with ground;
   a discharge resistor, wherein one end of the discharge resistor is connected with the base of the first triode, and the other end thereof is connected with ground; and
   a zener diode for stabilizing the voltage.

6. The miniature circuit breaker with short-circuit self-locking function, as recited in claim 4, characterized in that, further comprises: a detection switch located between the power conversion circuit and the phase line for disconnecting a power supply from the phase to the power conversion circuit in need of detection.

7. The miniature circuit breaker with short-circuit self-locking function, as recited in claim 4, characterized in that, the position detection circuit comprises:
   an optocoupler, wherein an output terminal of the optocoupler is connected with a control terminal of the trigger component; and
   a sample sub-circuit obtaining a voltage signal form the phase line, connected with an input terminal of the optocoupler after rectifying, filtering and stabilizing the voltage signal.

8. The miniature circuit breaker with short-circuit self-locking function, as recited in claim 4, characterized in that, further comprises: a second miniature circuit breaker, wherein the first miniature circuit breaker and the second miniature circuit breaker are respectively located two sides of the miniature circuit breaker operation output device and the linkage piece is combined with an action mechanism of the second miniature circuit breaker.

9. A miniature circuit breaker with position state detection function, characterized in that, which comprises: a first miniature circuit breaker and a miniature circuit breaker operation output device, in which,
   the first miniature circuit breaker located on the power line for cutting off a current of a circuit where the first miniature circuit breaker is by own closing or breaking action;
   the miniature circuit breaker operation output device for controlling the closing or breaking action of the first miniature circuit breaker, wherein the miniature circuit breaker operation output device comprises: a casing, in the casing, there are:
   a motor for outputting a torque;
   an action unit for obtaining the torque outputted by the motor and transferring the obtained torque to the closing or breaking action of the first miniature circuit breaker;
   a control unit for controlling a rotation and stop of the motor; and
   a position state detection unit, wherein when the closing or breaking action of the first miniature circuit breaker reaches a specific position, the control unit is triggered by the position state detection unit for controlling the motor to stop rotating,
   wherein the position state detection mechanism comprises:
   a first trigger bar, wherein a first end of the first trigger bar is hinged within the casing of the miniature circuit breaker operation output device by a hinged shaft, and an extending bar having a same direction with the hinged shaft is located at a second end of the first trigger bar;
   a first arched groove provided on the casing of the miniature circuit breaker operation output device, wherein the extending bar extends outside the casing of the miniature circuit breaker operation output device; and
   a second arched groove provided on a casing of the first miniature circuit breaker, wherein the extending bar extends into the first arched groove and is combined with a linkage mechanism of the first miniature circuit breaker.

10. The miniature circuit breaker with position state detection function, as recited in claim 9, characterized in that, further comprises a second miniature circuit breaker, wherein the first miniature circuit breaker and the second miniature circuit breaker are respectively located at two sides of the miniature circuit breaker operation output device, and a linkage piece is combined with an action mechanism of the second miniature circuit breaker.

11. The miniature circuit breaker with position state detection function, as recited in claim 9, characterized in that, the action unit comprises: a rotation portion, a hand setting portion and a linkage piece, wherein, the rotation portion obtains the torque outputted by the motor; and the hand setting portion is a shift lever fixedly placed on the rotation portion.

12. The miniature circuit breaker with position state detection function, as recited in claim 11, characterized in that, the rotation portion is a disc connected with an output shaft of the motor; or the rotation is a worm gear disc engaged with a worm placed on an output shaft of the motor.

13. The miniature circuit breaker with position state detection function, as recited in claim 11, characterized in that, the linkage piece comprises: a handle portion pivotally connected within the casing, wherein a top portion of the handle portion extends outside the casing, and a low-end extended section of the handle portion leans against the hand setting portion; and
   a linkage portion sleevedly provided on the handle portion and a top portion of the handle of one of the first miniature circuit breaker and the second miniature circuit breaker.

14. The miniature circuit breaker with position state detection function, as recited in claim 11, characterized in that, the linkage piece comprises: a rotation portion pivotally connected within the casing, and having a linkage bond placed hole, wherein a lower end of the rotation portion leans against the hand setting portion; and
   a linkage portion sleevedly provided on the handle portion and an upper portion of the handle of one of the first miniature circuit breaker and the second miniature circuit breaker.

15. The miniature circuit breaker with position state detection function, as recited in claim 11, characterized in that, the control unit comprises:
   a power conversion circuit, wherein a voltage signal is obtained from a phase line by the power conversion circuit, and then rectified, filtered for providing electrical components of the control unit with power;
   a position detection circuit which sends a first control signal when the miniature circuit breaker is detected to reach a target position; and
   a trigger component which obtains the first control signal for triggering the rotation or stop of the motor.

16. The miniature circuit breaker with position state detection function, as recited in claim 15, characterized in that, the position detection circuit comprises: a first limit switch, wherein one end thereof is connected with ground and is triggered by the position detection mechanism; or the position detection circuit comprises: an optocoupler, wherein an output terminal of the optocoupler is connected with a control terminal of the trigger component; and a sample sub-circuit obtaining a voltage signal form the phase line, connected with an input terminal of the optocoupler after rectifying, filtering and stabilizing the voltage signal.

17. The miniature circuit breaker with position state detection function, as recited in claim 15, characterized in that, the trigger component is a first triode, a base thereof is connected with the other end of the first limit switch, an emitter thereof is connected with ground, and a collector thereof is connected with the motor.

18. The miniature circuit breaker with position state detection function, as recited in claim 15, characterized in that, further comprises: a detection switch located between the power conversion circuit and the phase line for disconnecting a power supply from the phase to the power conversion circuit in need of detection.

\* \* \* \* \*